United States Patent Office 3,431,294
Patented Mar. 4, 1969

3,431,294
UNSATURATED BETA-HYDROXYALKYL CARBOXYLATE PREPARATION
Rostyslaw Dowbenko and Roger M. Christenson, Gibsonia, Pa., assignors to PPG Industries, Inc., a corporation of Pennsylvania
No Drawing. Filed Aug. 28, 1964, Ser. No. 392,909
U.S. Cl. 260—486  9 Claims
Int. Cl. C07c 67/00, 69/60, 69/54

ABSTRACT OF THE DISCLOSURE

This invention relates to a method of preparing beta-hydroxyalkyl esters of unsaturated carboxylic acids which comprises reacting an ethylenically unsaturated monocarboxylic acid with an alkylene oxide in the presence of a catalyst having the formula:

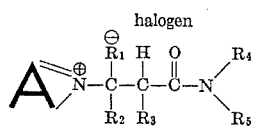

where A is selected from the group consisting of hydrocarbon radicals containing a chain of 5 carbon atoms forming with the nitrogen atom a six-membered pyridinium ring, and said hydrocarbon radicals having at least one of their hydrogen atoms replaced by a substituent selected from the group consisting of chlorine, bromine, iodine, fluorine and hydroxyl substituents, $R_1$, $R_2$, and $R_3$ are groups selected from the class consisting of (a) hydrogen, (b) halogen, (c) alkyl containing from 1 to 8 carbon atoms, (d) alkyl wherein a hydrogen atom is replaced by a substituent selected from the class consisting of a halogen atom and a hydroxyl group, (e) —$CONH_2$, (f) —$CH_2CONH_2$, (g) —COOH, (h) —$CH_2COOH$, and (i) —$CH_2COOR_0$, $R_0$ being selected from the class consisting of alkyl having from 1 to 8 carbon atoms with a substituent selected from the class consisting of a halogen atom and a hydroxyl group, and $R_4$ and $R_5$ are groups selected from the class consisting of hydrogen and alkyl having from 1 to 8 carbon atoms and radicals and groups obtained by replacement of a hydrogen atom of alkyl having from 1 to about 8 carbon atoms with a substituent selected from the class consisting of a halogen atom and a hydroxyl group. The products are useful as intermediates for thermosetting and thermoplastic polymers.

This invention relates to beta-hydroxyalkyl esters of ethylenically unsaturated carboxylic acids and the method of producing said esters. More particularly, this invention provides a novel catalytic system for the production of said esters by the reaction of unsaturated carboxylic acids with alkylene oxides.

Interest has recently been aroused in the use of hydroxyl containing comonomers in acrylic polymers of both the thermosetting and thermoplastic variety. Due to the commercial implications of these materials, new hydroxy-containing monomers and new methods of producing known monomers more economically and in high purity have been sought.

In United States Patent No. 3,079,394 there is disclosed a class of compounds, N-(2-carbamylalkyl) pyridinium salts which may be represented by the formula:

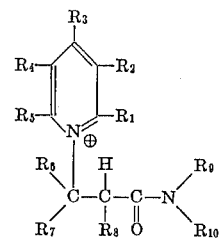

wherein X is an acid radical, such as chloride, bromide, iodide. Groups or radicals $R_1$, $R_2$, $R_3$, $R_4$ and $R_5$ may be hydrogen, halogen (—Cl, Br, I, F) hydrocarbon containing up to about 8 carbon atoms and being represented by methyl, ethyl, propyl, butyl, and the like; substituted hydrocarbon groups containing 1 to about 8 carbon atoms and being represented by methyl, ethyl, propyl, and the like, and having at least one hydrogen atom replaced by a substituent, such as a halogen or hydroxyl group. In the event that all or a part of the groups or radicals $R_1$, $R_2$, $R_3$, $R_4$ and $R_5$ are hydrocarbon or substituted hydrocarbon, pairs thereof may be consolidated or joined together into one or more rings on the pyridine ring. These pyridinium compounds, as well as the others herein disclosed, may be represented by the general formula:

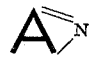

wherein A comprises, in addition to hydrogen atoms or such other radicals as may occur in the side chains, 5 carbon atoms in a chain attached at opposite ends to the nitrogen atom to provide a six-membered heterocyclic ring. Substituted compounds containing such rings are represented by picoline and lutidines, substituted pyridines wherein a plurality of hydrocarbon groups or substituted hydrocarbon groups are joined to provide aryl rings condensed with the pyridine ring, as represented by quinoline, isoquinoline, acridine, phenanthridine, and others. For example, in isoquinoline, the group A assumes the structure:

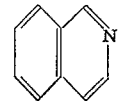

The groups $R_6$, $R_7$ and $R_8$ are represented by hydrogen, halogen (Cl, Br, I, F), alkyl hydrocarbons containing 1 to about 8 carbon atoms and being represented by methyl, ethyl, propyl and butyl, and by substituted hydrocarbon groups wherein one or more of the hydrogen atoms of said hydrocarbon containing 1 to about 8 carbon atoms are replaced by functional substituents represented by halogen (Cl, Br, I F), or —OH. One or more of the groups $R_6$, $R_7$ and $R_8$ may also be represented by carboxyl or carbonyl groups, usch as —$CONH_2$,

—$CH_2COONH_2$,

—COOH, —$CH_2COOH$ and COOR, wherein R is an aliphatic hydrocarbon group containing up to about 8 carbon atoms and being represented by methyl, ethyl, propyl, and the like.

Groups $R_9$ and $R_{10}$ may be atoms of hydrogen or alkyl groups containing up to about 8 carbon atoms, or substituents thereof in which at least one hydrogen atom is replaced by a group such as a halogen (Cl, Br, I or F) or a hydroxyl group.

As described in United States Patent No. 3,079,394, these compounds may be produced by the reaction between a pyridinium salt and an amide of an ethylenically unsaturated carboxylic acid, for example, the reaction of pyridinium chloride with acrylamide to produce N-(2-carbamylethyl)-pyridinium chloride.

It may be readily seen that salts having the foregoing generalized structure may be obtained by the replacement of acrylamide by amides of other ethylenically unsaturated carboxylic acids. Suitable amides include:

Acrylamide (already mentioned)
Methacrylamide
The diamide of glutaconic acid
Crotonamide
The diamide of ethyl maleic acid
The diamide of itaconic acid
The diamide of citraconic acid
Alpha-chloroacrylamide
Beta-chloroacrylamide
Alpha-ethyl acrylamide
Beta-propyl acrylamide, and others.

The amines utilized are those containing a pyridinium halide structure, including the chloride, the bromide and the iodide of:

Pyridine
2-methylpyridine
Quinoline
Acridine
Isoquinoline
Phenanthridine
2-benzylpyridine
3-benzylpyridine
3-bromopyridine
2-chloropyridine
3-chloropyridine
3-ethylpyridine
4-ethylpyridine
2-isopropylpyridine
3-methoxypyridine
2-phenylpyridine and others that contain a pyridine

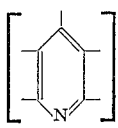

ring and are represented by the structure:

wherein A has the structure previously defined.

Compounds within the scope of the generalized formula include, for example:

N-(2-carbamylethyl)pyridinium chloride
N-(2-carbamylethyl)pyridinium bromide
N-(2-carbamylethyl)pyridinium iodide
N-(2-carbamylethyl)2-methylpyridinium chloride
N-(2-carbamylethyl)quinolinium chloride
N-(2-carbamylethyl)isoquinolinium chloride
N-(2-carbamylethyl)phenanthridinium chloride
N-(2-carbamyl-2-methylethyl)pyridinium chloride
N-(2-carbamyl-1-methylethyl)pyridinium chloride It has now been found that the above compounds catalyze the reaction of unsaturated dicarboxylic acid monoesters with alkylene oxides, esterifying the remaining carboxyl group. The resulting beta-hydroxyalkyl esters are obtained in a high degree of purity with a minimum of undesired side reactions. The reaction proceeds at low temperatures to high conversions.

The unsaturated carboxylic acid utilized in the process of this invention may be an ethylenically unsaturated carboxylic acid. Examples of such acids include acrylic, methacrylic, 3-butenoic angelic, tiglic, undecylenic acids and the like. Other unsaturated acids, which may be utilized in the process of this invention include the monoesters of ethylenically unsaturated dicarboxylic acids. The preferred acids from among this class of compounds are the aliphatic monoesters of an ethylenically unsaturated dicarboxylic acid, said ethylenically unsaturated dicarboxylic acid containing four to six carbon atoms where said aliphatic group contains up to 20 carbon atoms. Examples of this compound include the aliphatic monoesters of maleic acid, fumaric acid, chloromaleic acid, chlorofumaric acid, citraconic acid (methyl maleic acid), mesaconic acid (methyl fumaric acid), itaconic acid and the like. Examples of the aliphatic group include ethyl, propyl, butyl, isobutyl, butenyl, 2-ethyl hexyl, undecyl and stearyl. The most preferred compounds from the aforementioned class of compounds are the alkyl hydrogen fumarates where the alkyl group contains up to 10 carbon atoms. The ethylenically unsaturated carboxylic acid utilized in the process of this invention may bear additional substituents such as halogen, hydroxy, nitrile, and the like.

The alkylene oxide utilized in the process of this invention may be any 1,2-alkylene oxide. Examples of such alkylene oxides are ethylene oxide, propylene oxide, butylene oxide, epichlorohydrin, and the like. Preferably, the alkylene oxide contains one to four carbon atoms. More preferably, the alkylene oxide is selected from the group consisting of ethylene oxide and propylene oxide.

The amount of the catalyst employed is usually about 0.01 to about 0.07 mole of the catalyst per mole of the unsaturated dicarboxylic acid monoester. Larger amounts may be used, but apparently do not materially increase the yield. Preferably, the catalyst is employed in an amount of from about 0.02 to about 0.03 mole per mole of the unsaturated dicarboxylic acid monoester.

Generally, the reaction is conducted by mixing the unsaturated dicarboxylic acid monoester and the alkylene oxide in the presence of the catalyst. Preferably, a slight molar excess, 0.1 to 0.2 mole, of the alkylene oxide is used to achieve maximum conversion.

Preferably, the reaction is carried out by charging the reaction vessel with the unsaturated dicarboxylic acid monoester and the catalyst. The mixture is then heated to the desired reaction temperature. The alkylene oxide is then incrementally added over a period of time, usually from about 1 to 2 hours. When the addition is completed, the reaction mixture is preferably maintained at the desired reaction temperature until the reaction has gone substantially to completion. The total reaction time may be varied from about 2 to about 15 hours or more. Usually, the reaction is substantially complete in about 10 to about 15 hours.

The reaction temperature may be varied over a wide range. The reaction is preferably conducted at a temperature of from about 50° C. to about 80° C. While the reaction proceeds to room temperature, the rate is substantially slower than at slightly elevated temperatures. At higher temperatures volatilization of the reactants and undesirable side reactions complicate the procedure and reduce the yield. Nevertheless, the desired product is formed up to about 125° C.

Alternatively, the total charge of the reactants may be mixed together and reacted. The use of pressure may be desirable when the reaction is conducted in this manner, especially when elevated temperatures are employed, in order to maintain the reactants in solution.

Since the unsaturated carboxylic acid reactant and/or the desired product may undergo vinyl polymerization, it is desirable, but not essential, to have a polymerization inhibitor present in the instances where polymerization may occur. Apparently the conventional polymerization inhibitors, well known in the art, such as hydroquinone or its monomethyl ether, and quinones such as parabenzoquinone and naphthaquinone, effectively retard the polymerization during the reaction. The choice of the inhibitor and the amount utilized is to some extent governed by the reaction conditions. Usually, about 0.05 to about 1 percent or more of the inhibitor may be employed.

There are set forth below several examples which illustrate the method of producing the compounds of this invention and the manner in which such compounds were isolated and identified. These examples are, of course, given by way of illustration only and should not be construed as limiting the invention to the particular details thereof. All parts and percentages set forth, as is true throughout this specification, are by weight unless otherwise specified. All reduced pressure boiling points are stated in millimeters of mercury.

Example I.—Preparation of beta-hydroxypropyl methacrylate with N-(2-carbamylethyl)pyridinium chloride Into a reactor equipped with a reflux condenser, stirrer, thermometer and dropping funnel, there was charged 86.1 grams (1.0 mole) of methacrylic acid, 0.1 gram of hydroquinone, and 4.0 grams of N-(2-carbamylethyl)pyridinium chloride. The chloride did not go into solution. The mixture was heated to 65° C. and 63.8 grams (1.1 moles) of propylene oxide were added, dropwise, over a period of 1.25 hours while the temperature was maintained at about 60° C. It was noted that approximately 10 minutes after the oxide addition was begun, the chloride was totally dissolved. After a total reaction time of 4 hours, a small reflux was still apparent. The reaction mixture at that point had an acid number of 187.54. Total reaction time was 14 hours. The final acid number was 26.44 (4.1 percent MAA). The reaction product was distilled under reduced pressure after the addition of an additional quantity of hydroquinone.

Fraction I: 60° C. at 1.5 millimeters to 69° C. at 1.5 millimeters, 1.2 grams.
Fraction II: 69° C. at 1.5 millimeters to 83° C. at 1.5 millimeters, 133.9 grams (93.0 percent yield), acid number 31.22.
Residue: 10.6 grams.

Example II.—Preparation of beta-hydroxypropyl methacrylate with N-(2-carbamylethyl)pyridinium bromide In a repetition of Example I, 4.0 grams of N-(2-carbamylethyl)pyridinium bromide was substituted for the chloride of Example I.

Acid number at the end of 4.0 hours _____ 191.67
Total reaction time, hours _____ 13
Final acid number _____ 41.15

The reaction product was distilled to yield:

Fraction I: up to 72° C. at 3.5 millimeters, 1.7 grams.
Fraction II: 72° C. at 3.5 millimeters to 82° C. at 3.0 millimeters, 132.8 grams (92 percent yield), acid number 39.12.
Residue: 10.7 grams.

Example III.—Preparation of beta-hydroxypropyl methacrylate with N - (2-carbamylethyl)quinolinium chloride In a repetition of Example I, 4.0 grams of N-(2-carbamylethyl)quinolinium chloride was substituted for the chloride of Example I.

Acid number at the end of 4 hours _____ 186.13
Total reaction time, hours _____ 14.5
Final acid number _____ 36.38

The reaction product was distilled to yield:

Fraction I: up to 71° C. at 2.0 millimeters, 1.4 grams.
Fraction II: 71° C. at 2.0 millimeters to 82° C. at 2.0 millimeters, 131 grams (91 percent yield), acid number 36.92.
Residue: 11 grams.

Example IV.—Preparation of beta-hydroxypropyl methacrylate with N-(2-carbamylethyl)isoquinolinium chloride In a repetition of Example I, 4.0 grams of N-(2-carbamylethyl)isoquinolinium chloride were substituted for the chloride of Example I.

Acid number at the end of 4 hours _____ 245.4
Total reaction time, hours _____ 14.5
Final acid number _____ 59.56

The reaction product was distilled to yield:

Fraction I: up to 72° C. at 3.0 millimeters, 1.0 gram.
Fraction II: 72° C. at 3.0 millimeters to 84° C. at 2.5 millimeters, 129.3 grams (90 percent yield), acid number 51.13.
Residue: 10.2 grams.

Example V.—Preparation of beta-hydroxypropyl acrylate with N-(2-carbamylethyl)pyridinium chloride In a reactor equipped with a reflux condenser, stirrer, thermometer and dropping funnel there were charged 72.1 grams (1.0 mole) of acrylic acid, 0.1 gram of hydroquinone and 4.0 grams of N-(2-carbamylethyl)pyridinium chloride. The mixture was heated to 65° C. and 63.8 grams (1.1 moles) of propylene oxide were added, dropwise, over a period of 1.25 hours while the temperature was maintained at about 60° C. After the completion of the oxide addition, the temperature was maintained between about 60° C. and 65° C. for the remainder of the reaction time. After a total reaction time of about 4 hours, a small reflux was still apparent. The reaction mixture at that point had an acid number of 131.21. Total reaction time was 13 hours. The reaction product was distilled under reduced pressure after the addition of an additional quantity of hydroquinone.

Fraction I: up to 70° C. at 3.5 millimeters, 1.0 gram.
Fraction II: 72° C. at 3.5 millimeters to 92° C. at 3.0 millimeters, 114.7 grams (88 percent yield), acid number 38.02.

Example VI.—Preparation of beta-hydroxyethyl methacrylate with N-(2-carbamylethyl)pyridinium chloride In a reactor equipped with a reflux condenser cooled by solid carbon dioxide, stirrer, thermometer and dropping funnel, there were charged 86.1 grams (1.0 mole) of methacrylic acid, 0.1 gram of hydroquinone and 4.0 grams of N-(2-carbamylethyl)pyridinium chloride. The mixture was heated to 65° C. and 48.5 grams (1.10 moles) of ethylene oxide were added, dropwise, over a period of 5 hours. By the end of the addition, the reaction temperature had dropped to 40° C. at the end of a total reaction temperature had dropped to 40° C. At the end of a total reaction time of 9.6 hours, the reaction temperature had risen to 45° C. After a total reaction time of 10 hours, the reaction temperature had risen to 110° C. The reaction mixture was then cooled to room temperature. The reaction mixture was then distilled under reduced pressure after the addition of an additional amount of hydroquinone.

Fraction I: 30° C. at 1.7 millimeters to 68° C. at 1.7 millimeters, 2.5 grams.
Fraction II: 68° C. at 1.7 millimeters to 92° C. at 0.6 millimeter (the bulk distilled at 74° C. at 0.4 millimeter), 116.6 grams (89.7 percent yield).
Residue: 11.3 grams.

Example VII.—Preparation of beta-hydroxyethyl acrylate with N-(2-carbamylethyl)pyridinium chloride Into a reactor equipped with a reflux condenser cooled by solid carbon dioxide, stirrer, thermometer and dropping funnel, there were charged 72.1 grams (1.0 mole) of acrylic acid, 0.1 gram of hydroquinone and 4.0 grams of N-(2-carbamylethyl)pyridinium chloride. The mixture was heated to 65° C. and 48.5 grams (1.10 moles) of ethylene oxide were added, dropwise, over a period of 5 hours. By the end of the addition, the reaction temperature had dropped to 51° C. During subsequent heating, the reaction temperature was raised to 65° C. Total reaction time was 1.75 hours. The final acid number was 21.47. The reaction mixture was distilled under reduced pressure after the addition of a small amount of hydroquinone.

Fraction I: 30° C. at 3.0 millimeters to 75° C. at 2.7 millimeters, 1 gram.
Fraction II: 74° C. at 2.7 millimeters to 96° C. at 1.1 millimeters, 108.6 grams (93.5 percent yield) acid number 33.20.
Residue: 8.1 grams.

The progress of the reaction and the degree of conversion may be conveniently followed by periodically withdrawing samples and determining the acid number of the reaction mixture.

The beta-hydroxyalkyl esters produced by the process of this invention may be isolated from the reaction mixture by conventional techniques known to the organic chemist. The beta-hydroxyalkyl ester may be isolated by distilling the reaction mixture under reduced pressure. Alternatively, where the bulk of the impurities constitute unreacted starting materials, these may be removed by distillation or by passing a gas, such as nitrogen, through the reaction mixture to remove such relatively volatile impurities. The resulting residue, comprising mainly the beta-hydroxyalkyl ester, may be employed in subsequent reactions as such. Other methods of separation include chromatography and liquid-liquid extraction with appropriate solvents.

Although specific examples of the invention have been set forth, it is not intended to limit the invention solely thereto, but to include all the variations and modifications falling within the scope of the appended claims.

We claim:

1. A method of preparing beta-hydroxyalkyl esters of unsaturated carboxylic acids which comprises reacting an ethylenically unsaturated monocarboxylic acid selected from the group consisting of acrylic and methacrylic acids and monoalkyl esters of ethylenically unsaturated dicarboxylic acids, said acid containing 4 to 6 carbon atoms and said alkyl ester group containing 1 to 20 carbon atoms, with a 1,2-alkylene oxide in the presence of a catalyst having the formula:

$$A\overset{\oplus}{N}-\underset{H}{\overset{R_6}{C}}-\underset{H}{\overset{R_7}{C}}-\overset{O}{C}-N\overset{H}{\underset{H}{\diagdown}} \quad \ominus Y$$

where $$A\diagup^{N}\diagdown$$

is selected from the group consisting of (A)

$$R_4-\underset{R_5}{\diagup}\overset{R_3}{\diagdown}\underset{N}{\diagup}-R_2 \atop -R_1$$

where $R_1$, $R_2$, $R_3$, $R_4$ and $R_5$ are selected from the group consisting of hydrogen and unsubstituted alkyl groups containing 1 to 8 carbon atoms; and (B) a fused ring system selected from the group consisting of quinolinium, isoquinolinium and phenanthridinium; and $R_6$ and $R_7$ are selected from the group consisting of hydrogen and methyl and Y is selected from the group consisting of chlorine, bromine and iodine.

2. A method as claim 1 where the catalyst is present in the reaction mixture in an amount of from about 0.01 to about 0.07 mole per mole of the unsaturated carboxylic acid and where the reaction is conducted at a temperature between about 50° C. and about 80° C.

3. A method of preparing beta-hydroxyalkyl esters of unsaturated carboxylic acids which comprises reacting an acid selected from the group consisting of acrylic acid and methacrylic acid with an alkylene oxide selected from the group consisting of ethylene oxide and propylene oxide in the presence of a catalyst having the formula:

$$A\overset{\oplus}{N}-\underset{H}{\overset{R_6}{C}}-\underset{H}{\overset{R_7}{C}}-\overset{O}{C}-N\overset{H}{\underset{H}{\diagdown}} \quad \ominus Y$$

where $$A\diagup^{N}\diagdown$$

is selected from the group consisting of (A)

$$R_4-\underset{R_5}{\diagup}\overset{R_3}{\diagdown}\underset{N}{\diagup}-R_2 \atop -R_1$$

where $R_1$, $R_2$, $R_3$, $R_4$, and $R_5$ are selected from the group consisting of hydrogen and unsubstituted alkyl groups containing 1 to 8 carbon atoms; and (B) a fused ring system selected from the group consisting of quinolinium, isoquinolinium and phenanthridinium; $R_6$ and $R_7$ are selected from the group consisting of hydrogen and methyl and Y is selected from the group consisting of chlorine, bromine and iodine.

4. A method as in claim 3 where the catalyst is present in the reaction mixture in an amount of from about 0.01 to about 0.07 mole per mole of the unsaturated carboxylic acid and where the reaction is conducted at a temperature between about 50° C. and about 80° C.

5. A method of preparing beta-hydroxyalkyl esters which comprises reacting an acid selected from the group consisting of acrylic acid and methacrylic acid with an alkylene oxide selected from the group consisting of ethylene oxide and propylene oxide in the presence of a catalyst selected from the group consisting of N(2-carbamylethyl)pyridinium chloride, N(2-carbamylethyl) pyridinium bromide and N(2-carbamylethyl) pyridinium iodide.

6. A method as in claim 5 where the catalyst is an N(2-carbamylethyl)quinolinium halide selected from the group consisting of the chlorides, bromides, and iodides.

7. A method as in claim 5 where the catalyst is an N(2-carbamylethyl)isoquinolinium halide selected from the group consisting of the chlorides, bromides, and iodides.

8. A method as in claim 5 where the catalyst is N(2-carbamylethyl)isoquinolinium chloride.

9. A method as in claim 5 where the catalyst is N(2-carbamylethyl)quinolinium chloride.

References Cited

UNITED STATES PATENTS 3,079,394    2/1963    Dowbenko _____ 260—286

JAMES A. PATTEN, *Primary Examiner.*

E. J. SKELLY, *Assistant Examiner.*

U.S. Cl. X.R.

260—410.6, 485